UNITED STATES PATENT OFFICE.

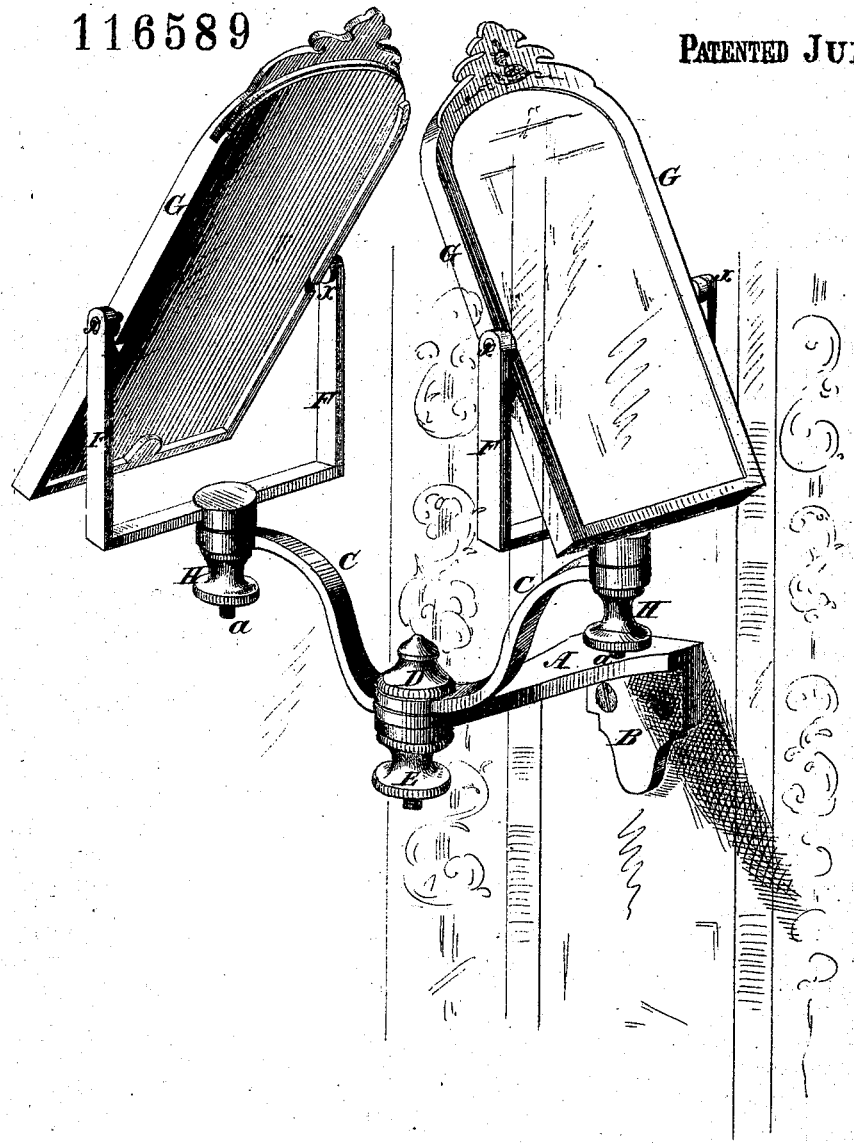

DOMINIKUS HARTMANN, OF MANSFIELD, OHIO.

IMPROVEMENT IN SUPPORTS FOR MIRRORS AND PICTURE-FRAMES.

Specification forming part of Letters Patent No. 116,589, dated July 4, 1871.

*To all whom it may concern:*

Be it known that I, DOMINIKUS HARTMANN, of Mansfield, in the county of Richland and State of Ohio, have invented a new and Improved Support for Mirrors and Picture-Frames; and I do hereby declare that the following is a full, clear, and exact description thereof, which will enable others skilled in the art to make and use the same, reference being had to the accompanying drawing forming part of this specification.

The accompanying drawing represents a perspective view of my improvement.

The object of this improvement is to provide a simple and convenient support for two or more mirrors or picture-frames upon a single bracket, the arrangement being such that the said mirrors or picture-frames may be readily separated and also adjusted to any desired position in respect to each other.

In the drawing, A represents a fixed bracket, provided with an angle-plate, B, by which the apparatus may be attached to a wall or other support by screws or other fastening. Attached to the bracket A are two movable arms, C, which are secured to the bracket A by a screw-bolt, D, and milled nut E, as shown in the drawing. The movable arms C can be moved laterally independent of each other upon the bracket A when the nut E is loosened, and the said arms can be retained in any desired position by tightening the nut E. The movable arms C support the yokes F, on which are hung and pivoted, at the points $x\ x$, the mirror-frames G, so that the latter can be adjusted to any desired vertical angle within said yokes. Projecting downward from the center of the under sides of the cross-bars of the yokes F are the screw-bolts $a$, which pass through the movable arms C, and which are secured thereto by the milled nuts H, as shown. When the nuts H are loosened the yokes F and mirror-frames G can be rotated on their bolts $a$ to any desired horizontal angle, and can be retained in such position by tightening the nuts H.

By this arrangement three separate adjustments of the mirrors can be made, as follows: 1st, the mirror-frames G and mirrors can be adjusted to any vertical angle in the yokes F. 2d, the said mirror-frames and yokes F can be adjusted to any horizontal angle on the arms C—for example, so that the mirrors can face each other and thus throw the reflection of one into the other. 3d, the mirrors can be separated and adjusted laterally with respect to each other and also to the bracket A, by the movable arms C. By moving the arms C apart, as shown in the drawing, the mirrors are readily separated, or they can be brought near to each other by moving the arms C together. The frames G and yokes F are so made that they can be removed from the bracket A and be placed one on each side of a window, if desired, separate brackets being provided for that purpose.

I do not claim supporting mirrors on brackets so as to admit of being turned at various angles to each other or to the wall of a room; but

I claim—

The mirror-frames G G, yokes F F, and arms C C, provided with screw-bolts and nuts, and arranged in connection with a single bracket, A, as specified, whereby the said parts may operate as set forth.

DOMINIKUS HARTMANN.

Witnesses:
T. E. BARROWS,
F. W. WAGNER.